United States Patent
Kolar

(10) Patent No.: US 8,899,824 B2
(45) Date of Patent: Dec. 2, 2014

(54) PROGRAMMABLE BLENDER HAVING RECORD AND PLAYBACK FEATURES

(75) Inventor: David J. Kolar, Stow, OH (US)

(73) Assignee: Vita-Mix Corporation, Cleveland, OH (US)

( * ) Notice: Subject to any disclaimer, the term of this patent is extended or adjusted under 35 U.S.C. 154(b) by 823 days.

(21) Appl. No.: 11/716,731

(22) Filed: Mar. 12, 2007

(65) Prior Publication Data

US 2008/0225636 A1    Sep. 18, 2008

(51) Int. Cl.
*B01F 13/00* (2006.01)
*A47J 43/07* (2006.01)

(52) U.S. Cl.
CPC .............. *A47J 43/0716* (2013.01); *A47J 43/07* (2013.01)
USPC ........................................................ 366/206

(58) Field of Classification Search
CPC ............................... A47J 43/07; A47J 43/0716
USPC ......................................................... 366/206
See application file for complete search history.

(56) References Cited

U.S. PATENT DOCUMENTS

| | | |
|---|---|---|
| 2,955,786 A | 10/1960 | Drew et al. |
| 3,299,226 A | 1/1967 | Edwards |
| 3,548,280 A | 12/1970 | Cockroft |
| 3,731,059 A | 5/1973 | Willson |
| 3,943,421 A | 3/1976 | Shibata et al. |
| 3,951,351 A | 4/1976 | Ernster et al. |
| 4,568,193 A | 2/1986 | Contri et al. |
| 4,686,356 A | 8/1987 | Ueda et al. |
| 4,762,057 A | 8/1988 | Hirota et al. |
| 4,822,172 A | 4/1989 | Stottmann |
| 4,893,942 A | 1/1990 | Stottmann |
| 4,968,864 A | 11/1990 | Doi et al. |
| 5,156,867 A | 10/1992 | Leuthold et al. |
| 5,267,211 A | 11/1993 | Kobayashi et al. |
| 5,267,790 A | 12/1993 | Sutherland et al. |
| 5,316,382 A | 5/1994 | Penaranda et al. |
| 5,347,205 A | 9/1994 | Piland |
| 5,363,746 A | 11/1994 | Gordon |
| 5,392,695 A | 2/1995 | Junkel |
| 5,531,153 A | 7/1996 | Maruyama et al. |
| 5,556,198 A | 9/1996 | Dickson, Jr. et al. |
| 5,562,020 A | 10/1996 | Shigeshiro |
| 5,577,735 A | 11/1996 | Reed et al. |
| 5,605,090 A | 2/1997 | Mantani et al. |
| 5,660,467 A | 8/1997 | Mineo et al. |
| 5,768,978 A | 6/1998 | Dorner et al. |
| 5,829,341 A | 11/1998 | Lin |
| 5,839,356 A | 11/1998 | Dornbush et al. |
| 5,967,021 A | 10/1999 | Yung |
| 6,364,522 B2 | 4/2002 | Kolar et al. |

(Continued)

OTHER PUBLICATIONS

Gaggia Publication Ipanema (I) , 2 pages.

(Continued)

*Primary Examiner* — Tony G Soohoo
(74) *Attorney, Agent, or Firm* — Renner, Kenner, Greive, Bobak, Taylor & Weber

(57) ABSTRACT

A programmable blender having record and playback features includes a record mode and a playback mode. When the blender is placed into the record mode, a processor stores a user created blending sequence to a memory unit. Alternatively, when the blender is placed into a playback mode, the processor automatically controls the operation of the blender in accordance with the stored blending sequence.

11 Claims, 4 Drawing Sheets

(56) References Cited

U.S. PATENT DOCUMENTS

| | | | |
|---|---|---|---|
| 6,402,365 B1 | 6/2002 | Wong | 366/206 |
| 2002/0009017 A1* | 1/2002 | Kolar et al. | 366/206 |
| 2002/0176320 A1* | 11/2002 | Wulf et al. | 366/205 |
| 2006/0203610 A1* | 9/2006 | Bohannon et al. | 366/206 |

OTHER PUBLICATIONS

Gaggia Publication Copacabana, 3 pages.
Gagga Publication Ipanema (II), 2 pages.
PCT Search Report and Written Opinion for PCT/US2008/002206 (6 pages), dated Jun./Jul. 2008.

* cited by examiner

PROGRAMMABLE BLENDER HAVING RECORD AND PLAYBACK FEATURES

TECHNICAL FIELD

The present invention relates in general to appliances used to process food and drinks. More particularly, the present invention pertains to food and drink blenders having a plurality of blend settings that may be adjusted by the user. More specifically, the present invention relates to such blenders where a combination of various blending functions adjusted by the user are recorded and stored as a blending sequence and may be played back by the user on demand.

BACKGROUND ART

Blenders to facilitate the processing of food, drinks, and other blended food preparations, have become ubiquitous in both commercial and residential settings. Such appliances are particularly useful where there are a variety of operations to be performed repeatedly with accuracy and precision.

Because changes in user taste or preference occur, the ability to create and store customized blending sequences provided by the blender has come about. For the purpose of the following discussion, the term "blending sequence" refers to the unique manner in which a user may increase and/or decrease the speed of the motor, as well as the adjustment of any other user adjustable features provided by the blender over time or with regard to any other suitable parameter. Typically, modification or addition of new blending sequences required that the blender be physically returned to the manufacturer where it was disassembled and reprogrammed. This process resulted in a tremendous inconvenience to users, thus making such blenders unattractive to potential buyers.

Furthermore, as blender technology has progressed, user selectable motor speed controls and timers have been incorporated into blenders to obtain greater consistency between each blended preparation. However, even with such controls, the primary obstacle in creating consistently blended preparations, such as blended drinks, is that the user is required to adjust the motor speed consistently each time a blending sequence is performed.

Recently, advances in semiconductor memories have made it feasible for blenders to include memories in which the varying motor speed and operating intervals of the blender required for making a blended preparation may be stored. Typically, these programmable blenders read information regarding a blending sequence that has been encoded by an external programming device onto a magnetic strip adhered to a plastic card. As such, these devices require an external device such as a computer to enter, modify or duplicate the drink programs maintained by the plastic card. However, the component costs necessitated by such a system often makes a blender incorporating such features extremely expensive. Furthermore, keeping track of the various program cards used with such a system is generally tedious, as the cards are easily misplaced.

Furthermore, these programmable blenders are generally limited in the amount of complexity that the drink program may contain. For example, a typical drink program may contain only a limited number of slow or fast ramps, and speed changes. In addition typical drink programs may provide a reduced level of control over the deceleration of the blender's blades. Moreover, drink programs may also be limited to the number of burp cycles that can be repeated for a give blending sequence. It should be appreciated that a burp cycle is performed when the blender reduces the speed of its blades while mixing a substance. This reduced speed is maintained until the pocket of air is released through the substance, whereupon the speed of the blades is then increased to finish mixing the substance. As such, typical programmable blenders limit a user's ability to create customized blending programs or sequences. Furthermore, current programmable blenders do not allow the user to become part of the feedback system of the blending process. And as such, don't allow the user to obtain enhanced blending cycles as the modification to blending sequences created by current programmable blenders are done offline in a non-real time manner.

Therefore, there is a need for a programmable blender having a record and playback feature that is capable of recording blending sequences that include the customized manner in which the user has selectively adjusted the various blending functions of the blender. There is also a need for a programmable blender having a record and playback feature that has an integrated blender memory unit allowing a user to store and play back a blending sequence. Additionally, there is a need for a programmable blender having a record and playback feature that includes a program selector switch, enabling a user to select a desired stored blend sequence. In addition, there is a need for a programmable blender having a record and playback feature that allows a user to be part of the feedback system of the blending process so as to create enhanced blending sequences. Furthermore, there is a need for a programmable blender having a record and playback feature that allows the user to record and store complex blending sequences that comprise a plurality of real-time motor speed variations.

DISCLOSURE OF THE INVENTION

It is thus an object of the present invention to provide a blender which has the ability to record blending sequences created by a user.

It is another object of the present invention to provide a blender, as above, which has the ability to playback a previously recorded blending sequence.

It is still another object of the present invention to provide a blender, as above, which includes a program selector switch that allows a user to choose a particular memory location at which a blending sequence may be recorded.

It is still yet another object of the present invention to provide a blender, as above, in which the program selector switch allows a user to choose a particular memory location from which a recorded blending sequence may be played back on demand.

It is still another object of the present invention to provide a blender, as above, which includes a data interface that allows the blender to communicate with a remote computing device so that transferred blending sequences can be further modified.

These and other objects of the present invention, as well as the advantages thereof over existing prior art forms, which will become apparent from the description to follow, are accomplished by the improvements hereinafter described and claimed.

In general, a blender having record and playback features includes a blade assembly, a motor to rotate the blade assembly, and a processor coupled to the motor. The blender also includes a memory unit maintained by the processor, and a setting switch that is coupled to the processor, whereby the setting switch creates one or more blending sequences. In addition, the processor is configured to be placed into either a record mode or a playback mode. When the processor is placed into a record mode, the processor stores the blending sequence in the memory unit. And when the processor is placed into the playback mode, the processor controls the motor in accordance with the stored blending sequence.

In accordance with another aspect of the present invention, a method for recording a blending sequence in a blender having a memory includes the following steps. Providing a blender with user adjustable features. Placing the blender into a record mode. Adjusting at least one of the adjustable features, so as to create a blending sequence. And recording the blending sequence to the memory of the blender.

In accordance with yet another aspect of the present invention, a method for playing back a blending sequence in a blender having a playback mode includes the following steps. Placing the blender into the playback mode. Selecting a blending sequence stored in the blender. And automatically playing back the blend sequence selected at the selecting step.

A preferred exemplary blender having record and playback features according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
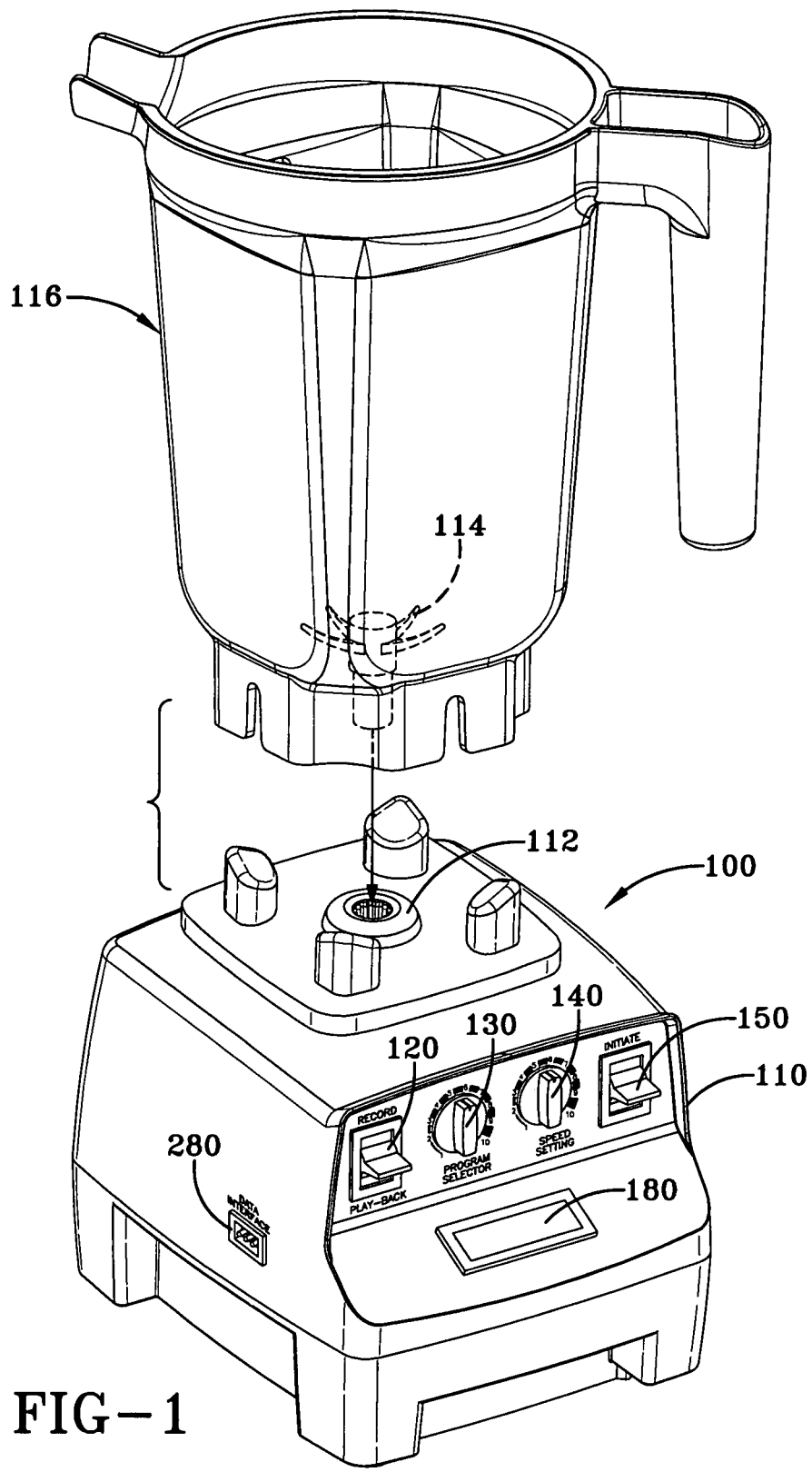
FIG. 1 is a perspective view of a blender in accordance with the concepts of the present invention.

A blender having record and playback features is generally referred to by the numeral 100 as shown in FIG. 1 of the drawings. Blender 100 includes a base 110, from which extends a rotatable shaft 12 that carries a set of blades 114 carried by a removable a pitcher 116. In addition, base 110 provides various operational features that may be invoked by the user of blender 100, including: a record/playback toggle switch 120, a program selector switch 130, a speed setting switch 140, and an initiate switch 150. Record/playback switch 120 allows a user to place blender 100 into a record or a playback mode, as will hereinafter be discussed in more detail. Additionally, record/playback switch 120 may provide a normal mode in which blender 100 operates normally, without the performance of any of the record and playback features. Program selector switch 130 has a plurality of positions corresponding to specific memory locations where the various blending sequences are stored and retrieved. Speed setting switch 140 allows the user to adjust the speed of blades 114 of blender 100 in a variable manner to create blend sequences. As previously discussed, a blending sequence includes the unique manner in which a user may increase and decrease the speed of shaft 112 via speed setting switch 140 over time. However, in addition to shaft speed, it should also be appreciated that a blending sequence may be based on any operating parameter associated with the operation of the blender 100. For example, the blending sequence may be based on changes in one or more operating parameters that include, but are not limited to: changes in the torque of the blades 114, temperature variations occurring in the mixture being blended, time of operation, changes in current or amperage drawn by the motor 264, or any other variable, or combination thereof, such as blade speed divided by motor current for example. It should also be appreciated that the blender 100 may also include a display 180 configured to graphically display the value or magnitude of a desired operating parameter to the user. For example, the display 180 may depict the value or magnitude of the operating parameter being controlled by the user, or the display 180 may present an operating parameter that the user is not directly controlling. Finally, initiate switch 150 allows a user to initiate and deactivate the operation of either the record mode or the playback mode depending on which position record/playback switch 120 is placed.

Figure 2:
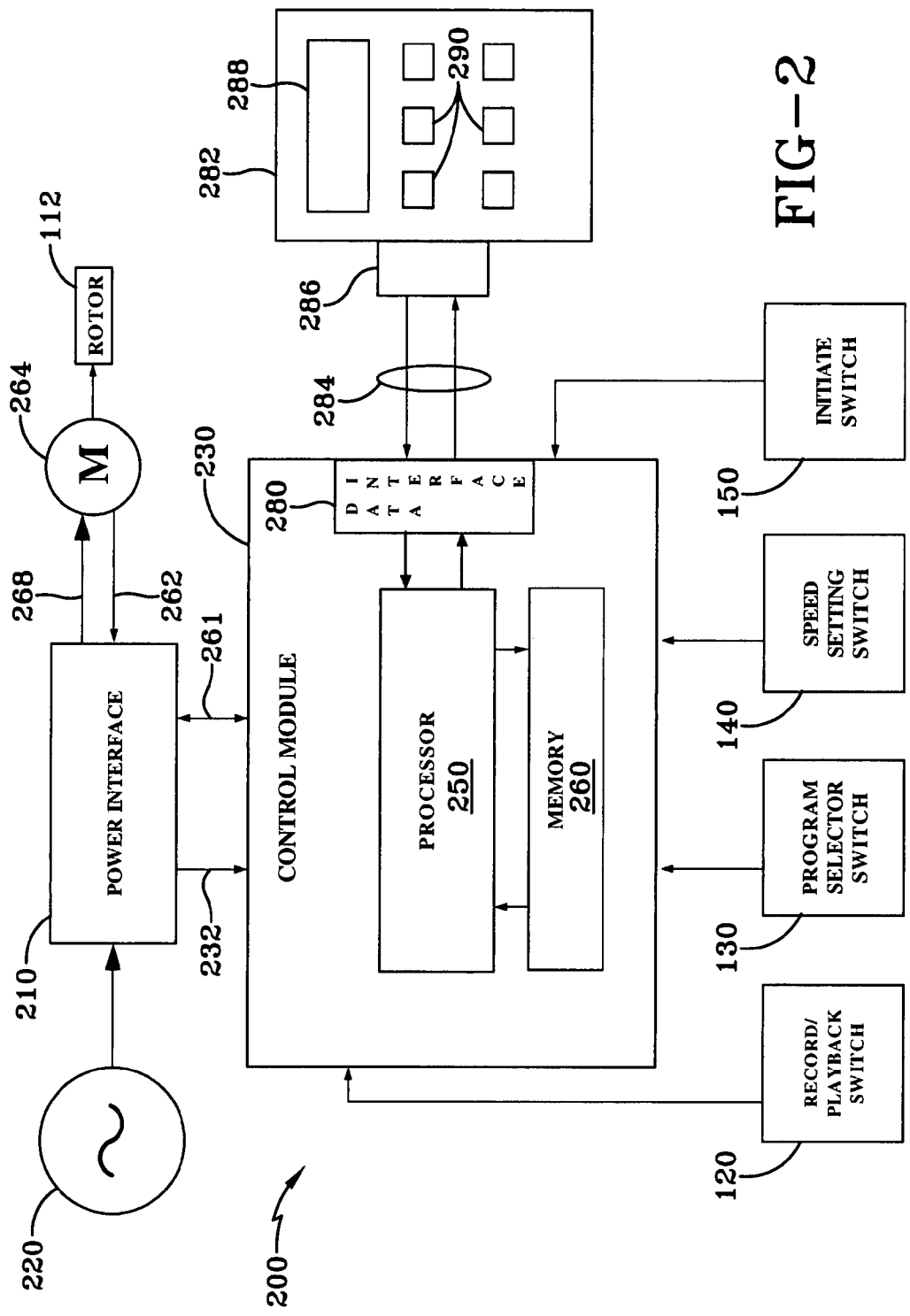
FIG. 2 is a block diagram of a blender control in accordance with the concepts of the present invention.

A blender control used to carryout the operational features provided by blender 100 is generally referred to by the numeral 200 as shown in FIG. 2. Blender control 200 includes a power interface 210 that receives A.C. mains power, such as 120 VAC at 60 Hz, from a standard residential mains power source 220. The power interface 210 converts the A.C. mains power 220 into D.C. power, which is supplied to a control module 230 via a control power line 232. Control module 230 includes a processor 250 and a memory unit 260 that is coupled thereto. Processor 250 comprises the necessary logic implemented in hardware, software, or a combination of both, necessary to carryout the functions to be discussed below. In addition, processor 250 may maintain various working registers and status bits necessary for the operation of blender 100. Memory unit 260 includes non-volatile memory, such as flash memory (i.e., flash ROM), or any other suitable electrically erasable programmable memory (EEPROM). In addition, memory unit 260 may be a separate component as shown in FIG. 2 or may be integrated into the logic of the circuitry of processor 250 as an embedded memory. Also coupled to control module 230 through power interface 210 via motor speed control lines 261 and 262, is a motor 264 which drives rotor 112, which rotates blades 114 maintained by pitcher 116. Thus, during operation of blender 100, processor 250 sends suitable motor speed control signals to power interface 210, which in turn controls the amount of power supplied to the motor via a motor power line 268 in order to control the speed of blades 114. Correspondingly, motor 264 provides a motor speed signal to power interface 210 via the motor speed control lines 261, 262, which is in turn relayed to processor 250. This allows processor 250 to continuously monitor the speed of motor 264.

Also coupled to control module 230 are record/playback switch 120, program selector switch 130, speed setting switch 140, and initiate switch 150. During operation of blender 100, the user may actuate record/playback switch 120 so as to place blender 100 into a record mode, a playback mode, or into a normal mode. In the record mode, processor 250 monitors the program selector switch 130, speed setting switch 140, and initiate switch 150. Next, the user places program selector switch 130 to a desired position to which the recorded blending sequence is to be stored. Each position of program selector switch 130 is associated with a predetermined pointer address that identifies a specific memory location within memory unit 260. Continuing, the user of blender 100 actuates initiate switch 150, causing processor 250 to begin recording the blending sequence that includes the adjustments of speed setting switch 140 as adjusted by the user. The created blending sequence is stored to an area in memory unit 260 that is associated with the pointer address that is identified by the position of program selector switch 130. Thus, each position of program selector switch 130 is associated with a different pointer address that identifies the memory location in memory unit 260 in which a particular blending sequence may be stored for future playback. In other words, the recording mode allows processor 250 to capture in real-time the adjustment of the operational features, such as motor speed of the blender, as they are changed by the user during a blending sequence. Thus, the recording mode records the real-time speed settings as it is adjusted via speed setting switch 140 during a blending sequence.

Correspondingly, if the user desires to playback a stored blending sequence, the user places blender 110 into the playback mode by placing record/playback switch 120 into the playback position. Once blender 100 is in the playback mode, program selector switch 130 is used to select a stored blending sequence. Once a stored blending sequence is selected the user actuates initiate switch 150. That is, upon placing program selector switch 130 in a specific position, processor 250 acquires the blending sequences from memory locations identified by the pointer address identified by the position of selector switch 130. This results in processor 250 automatically controlling the speed of motor 264 in accordance with the selected blending sequence.

In a further embodiment, the control module 230 may provide a data interface 280 to allow selected blending sequences to be transferred to a data interface 286 maintained by a remote computing device 282, via a removable, bidirectional data link 284. The data interfaces 280,286 may be configured to provide serial or parallel data transfer between the processor 250 of the blender 100 and the remote computing device 282. In one aspect, the data interfaces 280,286 may comprise a USB (universal serial bus) interface or wireless port. Specifically, the remote computing device 282 may comprise a handheld or mobile computing unit, or may comprise a fixed or standalone computing unit, such as a personal computer for example. In one aspect the remote computing device 282 may comprise a PDA (personal data assistant), a laptop computer, or any other mobile computing unit that maintains the necessary hardware, software, memory, and input device to enable a user to perform various functions in a manner to be discussed. In addition to the data interface 286, the remote computing device 282 may also include a viewable display 288, and an input device 290. The display 288 may be comprised of an LCD display (liquid crystal display), or the like, so as to allow the user to view a graphical depiction of a transferred blend sequence. Furthermore, the input device 290 may comprise a keypad, mouse, stylus, or any other suitable mode of input that allows the user to invoke various functions maintained by the remote computing device 282.

In order to communicate one or more blending sequences between the blender 100 and the remote computing device 282, the user couples the data link 284 between the data interface 280 maintained by the blender 100, and the data interface 288 maintained by the remote computing device 282. Once coupled, data comprising one or more blending sequences may then be downloaded from the blender 100 to the remote computing device by invoking an associated function using the input device 290. After one or more blending sequences have been transferred to the remote computing device 282, a selected blending sequence may be shown graphically via the display 288. Next, the user may then identify the particular areas, or segments of the blending sequence that he or she wishes to modify using the input device 290. Once a desired area of the blending sequence has been identified, the user may edit, or otherwise modify one or more characteristics maintained by the blend sequence by invoking the desired function using the input device 290. For example, the user may modify the speed of the blades 114 with regard to time, or the user may modify the time or duration for which the blade speed is maintained. In other words, any of the attributes or characteristics comprising the blending sequence may be modified by the user via the remote computing device 282. Once modified, the blending sequence may then be transferred from the remote computing device 282 to the blender 100 via the data link 284, where the blending sequence is stored at the memory 260. The user may then select the modified blending sequence in the manner previously discussed. Furthermore, it should be appreciated that the data link 284 may comprise a wireless communication link if the control module 230 of the blender 100 and the remote computing device 282 are each configured with compatible wireless transceivers. In addition, it is contemplated that the blender 100 and the remote computing device 282 may be configured to communicate blending sequences in the manner discussed via a wired or wireless computer network, such as the Internet for example.

Figure 3A:
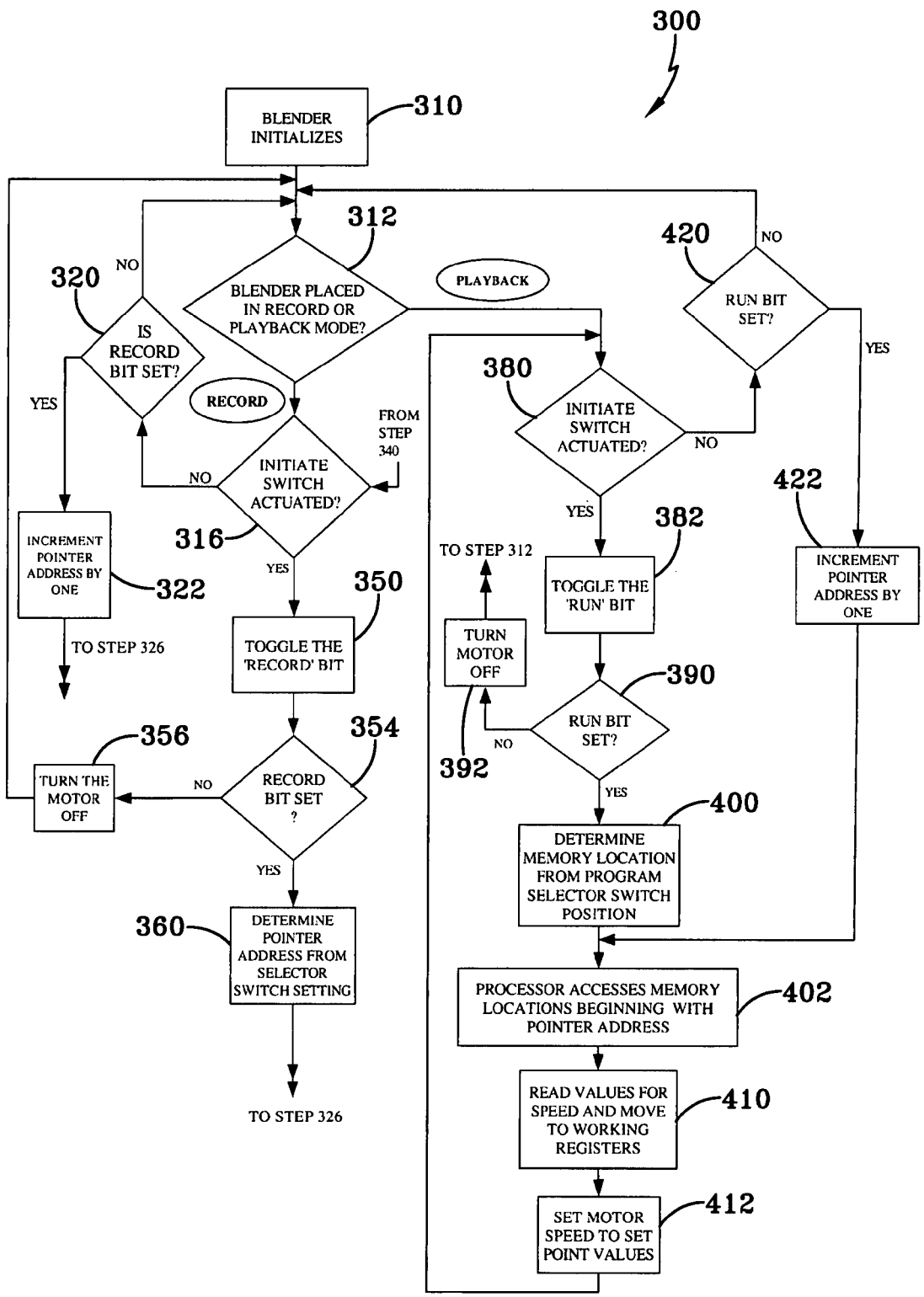
FIGS. 3A-3B represent a flow chart setting forth the operational steps taken by the blender when a record and a playback feature are invoked in accordance with the concepts of the present invention.
Figure 3B:
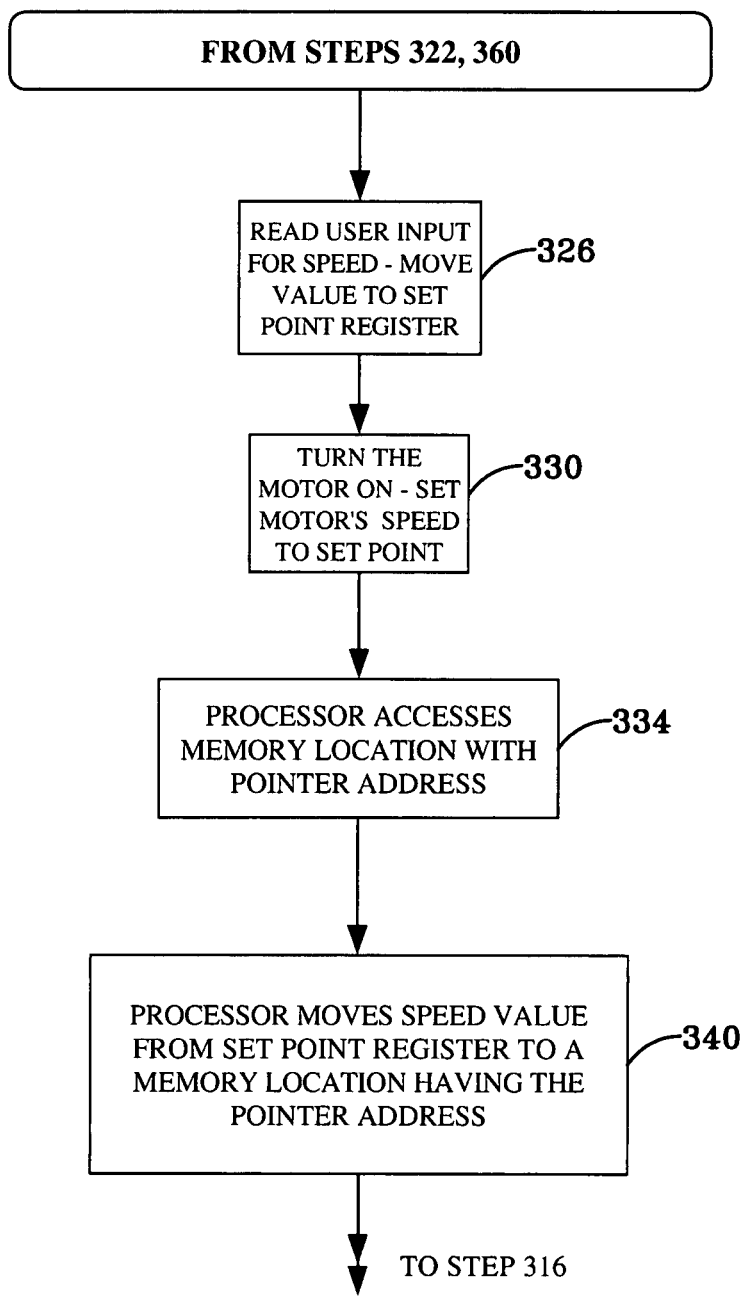

While the basic functions of the record and playback modes provided by blender 100 have been set forth above, the operational steps taken when the record and playback modes are initiated, are generally referred to by the numeral 300, as shown in detail in FIG. 3. Specifically, the operational steps 300 show the sequence taken by processor 250 of blender control 200 when the record or playback modes are initiated by the user. Thus, initially at step 310, processor 250 is initialized by turning on blender 100 via a power switch (not shown). Next, at step 312, the process 300 determines whether the user has placed blender 100 into a record mode or a playback mode via the record/playback switch 120. If the user has placed blender 100 into the record mode, then the process 300 continues to step 316, where it is determined if initiate switch 150 has been actuated. If initiate switch 150 has not been actuated, then the process 300 continues to step 320. At step 320, the process 300 determines whether a record status bit has been previously set at processor 250. If the record status bit has not been set at processor 250, then the process 300 returns to step 312. However, if at step 320, the process 300 determines that the record status bit has been set, then the pointer address is incremented by one via processor 250, as indicated at step 322. Next, at step 326, as the blend cycle is being performed, processor 250 determines the motor speed as it is adjusted by the user via speed setting switch 140 in real-time. Somewhat simultaneously, this motor speed setting is stored as a motor set point value in a set point register (not shown) that is maintained by processor 250. Continuing to step 330, processor 250 adjusts the speed of motor 264 to the motor set point value stored in the set point register indicated at step 326. Once motor 264 has been set to the set point speed stored in the set point register, the process 300 continues to step 334, where processor 250 accesses the memory location in memory unit 260 having the pointer address, which was updated at step 322 so that the blending sequence can be stored in memory unit 260. Finally, at step 340, the motor set point value stored in the set point register at step 326 is stored in the memory location identified at step 334. After, the completion of step 340, the process 300 returns to step 316.

If the process 300 determines at step 316 that initiate switch 150 has been actuated then the record status bit maintained by processor 250 is toggled (i.e. the status bit transitioning from a binary 1, to a binary 0, or vice versa), as indicated at step 350. Next, at step 354, the process 300 determines whether the record status bit has been set after it has been toggled. If the record bit has not been set, then the process continues to step 356, where motor 264 is turned off, while returning back to step 312 of the process 300. However, if the record status bit was found to be set at step 354, then processor 250 determines the pointer address that is established by the position of program selector switch 130, as indicated at step 360. After step 360 has been completed, the process 300 completes steps 326-340 in the manner previously discussed. Once step 340 has been completed, the process 300 returns to step 316, whereupon if initiate switch 150 is not actuated and the record status bit remains set, steps 360-340 are continuously performed, thus allowing the user to record a blending sequence that may be replayed on demand.

Returning to step 312, if the user has placed blender 100 into the playback mode via record/playback switch 120, then the process 300 continues to step 380, where processor 250 determines whether initiate switch 150 has been actuated. If initiate switch 150 has been actuated, then the process 300 continues to step 382, where a run status bit is set at processor 250. Once the run status bit is toggled, the process 300 determines if the run status bit has been set, as indicated at step 390. If the run status bit has not been set, then the process 300 continues to step 392, where motor 264 is turned off, while the process 300 returns to step 312 as previously discussed. However, if the run status bit has been set at step 390, processor 250 acquires the pointer address that is established according to the position of program selector switch 130, as indicated at step 400. At step 402, processor 250 accesses the memory location in memory unit 260 having the pointer address determined at step 400. Next, the values for the motor speed set point values and time that are stored in memory locations associated with the pointer address, are moved to the working registers maintained by processor 250, as indicated at step 410. It should be appreciated that the motor speed set point values and time values that are acquired are associated with the blending sequence that was previously recorded when blender 100 was placed into the record mode at step 312. Once the speed set point values and time values are moved to the working registers, the process continues to step 412, where processor 250 adjusts the speed of motor 264 in accordance with the time and the set point speed values stored in the working registers, while returning to step 380. As a result, the user of blender 100 is provided with on demand playback of a previously recorded blending sequence.

However, if initiate switch 150 has not been actuated at step 380, then the process continues to step 420, where processor 250 determines whether the run status bit has been set. If the run status bit has not been set, then the process 300 returns to step 312. However, if the run status bit has been set, then the process 300 continues to step 422, where the pointer address is incremented by a value of one. After completing step 422, the process 300 continues to step 402 as previously discussed. It should be appreciated that while the pointer address may be incremented by a value of one, any other value may be used to increment the pointer address at steps 322 and 422.

It will, therefore, be appreciated that one advantage of one or more embodiments of the present invention is that a blender having record and playback features allows a user to record blending sequences in real-time. Still another advantage of the present invention, is that a blender having record and playback features records the blending sequence directly as the user operates the blender. Another advantage of the present invention is that a blender having record and playback features may store a plurality of recorded blending sequences, that are selectable by the user for later playback. Still another advantage of the present invention is that a blender having record and playback features allows a user to create custom blending sequences of any desired complexity. In addition, a further advantage of the present invention is that a blender having record and playback features maintains a data interface so that a remote computing device can modify transferred blending sequences. As a result, the system described herein accomplishes the objects of the invention and otherwise substantially improves the art.

What is claimed is:

1. A blender having record and playback features comprising:
    a motor adapted to rotate a blade assembly;
    a processor coupled to said motor and coupled to a memory unit, said memory unit configured to store one or more blending sequences to control said motor;
    a record/playback switch coupled to said processor to place said processor into either of a record mode or a playback mode; and
    a variably adjustable speed setting switch coupled to said processor to control the speed at which said motor rotates said blade assembly;
    wherein without initiating a previously stored blending sequence at the blender, said processor executes said record mode, such that said processor simultaneously records, and said memory unit stores as a new blending sequence, only the changes in speed of said motor that are made as said speed setting switch is adjusted by a user while at least one ingredient is being blended by the blade assembly; and
    wherein said processor executes said playback mode, such that said processor controls said motor in accordance with said new blending sequence.

2. The blender of claim 1, further comprising a program selector switch coupled to said processor, said program selector switch selectively identifying a memory location in said memory unit where said new blending sequence is stored during said record mode.

3. The blender of claim 2, further comprising an initiate switch coupled to said processor, said initiate switch starting said recording mode when actuated.

4. The blender of claim 1, further comprising a program selector switch coupled to said processor, said program selector switch identifying a memory location in said memory unit from where said new blending sequence is retrieved during said playback mode.

5. The blender of claim 4, further comprising an initiate switch coupled to said processor, said initiate switch starting said playback mode when actuated.

6. The blender of claim 1, further comprising a remote computing device adapted to communicate with said processor, said computing device providing a first user invoked function;
    wherein said processor transfers at least one of said one or more blending sequences to said remote computing device when said first user invoked function is invoked at said computing device.

7. The blender of claim 6, wherein said remote computing device includes a display for viewing said one or more blending sequences.

8. The blender of claim 6, wherein said remote computing device includes an input device to select a particular segment of said at least one transferred blending sequence.

9. The blender of claim 8, wherein said remote computing device modifies said selected blending sequence segment when a second user invoked function provided by said computing device is invoked.

10. The blender of claim 6, further comprising a data interface, wherein said remote computing device communicates with said processor via a data interface.

11. The blender of claim 1, further comprising a display for showing an operational parameter of the blender.

* * * * *